United States Patent
Neese et al.

(10) Patent No.: US 9,758,094 B1
(45) Date of Patent: Sep. 12, 2017

(54) VEHICLE INDICATOR CIRCUIT HAVING CONTROLLED BACKLIGHTING

(71) Applicant: Nidec Motor Corporation, St. Louis, MO (US)

(72) Inventors: Thomas A. Neese, Columbus, IN (US); Jon Everhart, Rochester Hills, MI (US); Shakim S. Qureshi, Warren, MI (US); John R. Suriano, Auburn Hills, MI (US); Stephen M. Jones, Greenfield, IN (US)

(73) Assignee: Nidec Motor Corporation, St. Louis, MO (US)

( * ) Notice: Subject to any disclaimer, the term of this patent is extended or adjusted under 35 U.S.C. 154(b) by 0 days.

(21) Appl. No.: 15/095,677

(22) Filed: Apr. 11, 2016

(51) Int. Cl.
*H05B 33/00* (2006.01)
*B60Q 3/04* (2006.01)
*H05B 33/08* (2006.01)

(52) U.S. Cl.
CPC ............ *B60Q 3/046* (2013.01); *B60Q 3/044* (2013.01); *H05B 33/0815* (2013.01); *H05B 33/0845* (2013.01)

(58) Field of Classification Search
CPC .... B60K 2350/2039; B60Q 1/22; B60Q 1/24; B60Q 1/2611; B60Q 1/2665; B60Q 1/2676; B60Q 1/2696; B60Q 1/34; B60Q 1/343; B60Q 1/346; B60Q 1/50; B60Q 1/56; B60Q 9/008; B61L 15/0072; B61L 15/0081
See application file for complete search history.

(56) References Cited

U.S. PATENT DOCUMENTS

| | | | |
|---|---|---|---|
| 6,388,388 B1 | 5/2002 | Weindorf et al. | |
| 6,441,943 B1* | 8/2002 | Roberts ................ | B60Q 1/2665 250/214 AL |
| 7,342,707 B2 | 3/2008 | Roberts et al. | |
| 7,482,547 B2 | 1/2009 | Katsumoto et al. | |
| 8,188,666 B2 | 5/2012 | Tseng | |
| 8,901,833 B2 | 12/2014 | Tsai et al. | |
| 2004/0070964 A1 | 4/2004 | Lo | |
| 2004/0217712 A1 | 11/2004 | Takeda et al. | |
| 2007/0030137 A1 | 2/2007 | Masters et al. | |
| 2011/0037582 A1 | 2/2011 | Wu | |
| 2013/0127897 A1* | 5/2013 | Baker ....................... | G09F 9/46 345/593 |

OTHER PUBLICATIONS

International Search Report and Written Opinion of related application PCT/US17/17126 dated May 1, 2017, 9 pages.

* cited by examiner

*Primary Examiner* — Monica C King
(74) *Attorney, Agent, or Firm* — Senniger Powers LLP

(57) ABSTRACT

Indicator circuit having a backlight and an indicator light associated with a graphical element. The graphical element is adapted to be illuminated by the indicator light for indicating an active vehicle function as well as backlit by the backlight. A switch coupled to the backlight selectively turns OFF the backlight in response to a drive signal supplied by the indicator light. In this manner, the backlight is OFF when the graphical element is illuminated by the indicator light.

10 Claims, 3 Drawing Sheets

VEHICLE INDICATOR CIRCUIT HAVING CONTROLLED BACKLIGHTING

BACKGROUND

Modern vehicles include a number of gauges, indicators, and various other displays to provide vehicle operators with pertinent information, such as a vehicle's active operating or driving mode (e.g., all-wheel drive, two-wheel drive, traction control, towing mode, etc.). In a conventional display, one or more backlights illuminate a number of graphical elements from the back or side of the display panel to improve readability, especially in low light conditions.

In addition to backlighting, indicator lights selectively illuminate the graphical elements of a display to indicate which of a vehicle's functions are active. Unfortunately, even if the indicator lights and backlights have distinctly different intensities and colors, backlighting can severely shift the color of an indicator light illuminating a particular graphical element and essentially "wash out" the indicator color. Additionally, backlighting is often bright enough relative to the indicator lighting to "wash out" the indicator intensity.

SUMMARY

Aspects of the invention permit graphical elements of a vehicle's display to be backlit without "washing out" the indicator lighting.

Briefly described, an indicator circuit embodying aspects of the invention includes a backlight and an indicator light. Both the backlight and the indicator light are associated with a graphical element that is adapted to be illuminated by the indicator light for indicating an active vehicle function as well as backlit by the backlight. A switch coupled to the backlight selectively turns OFF the backlight in response to a drive signal supplied by the indicator light. In this manner, the backlight is OFF when the graphical element is illuminated by the indicator light.

In an aspect, a backlit indicator system includes a display having a plurality of graphical elements and a plurality of lighting circuits. Each of the lighting circuits corresponds to one of the graphical elements and includes a backlight light emitting diode (LED), an indicator LED, and a switch. The backlight LED is configured to backlight the corresponding graphical element during a low light condition and the indicator LED is configured to selectively illuminate the corresponding graphical element for indicating an active vehicle function. The switch alternately backlights and illuminates the corresponding graphical element. The switch is electrically connected to the backlight LED and to the indicator LED for selectively turning OFF the connected backlight LED in response to a drive signal supplied by the indicator LED. In turn, the backlight LED is OFF when the corresponding graphical element is illuminated by the indicator LED.

A method of alternately backlighting and illuminating a graphical element embodies further aspects of the invention. The method includes electrically connecting a plurality of lighting circuits to a display having a plurality of graphical elements. Each of the lighting circuits corresponds to one of the graphical elements. In addition each of the lighting circuits includes a backlight LED configured to backlight a corresponding graphical element during a low light condition and an indicator LED configured to selectively illuminate the corresponding graphical element for indicating an active vehicle function. The method also includes electrically connecting a switch, such as an NPN transistor, to the backlight LED and the indicator LED for alternately backlighting and illuminating the corresponding graphical element. Further, the method includes driving the base of the NPN transistor with an active low indicator signal from a vehicle control module to bias OFF the backlight LED when the indicator LED is ON in response to the active low indicator signal turning ON the indicator LED.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
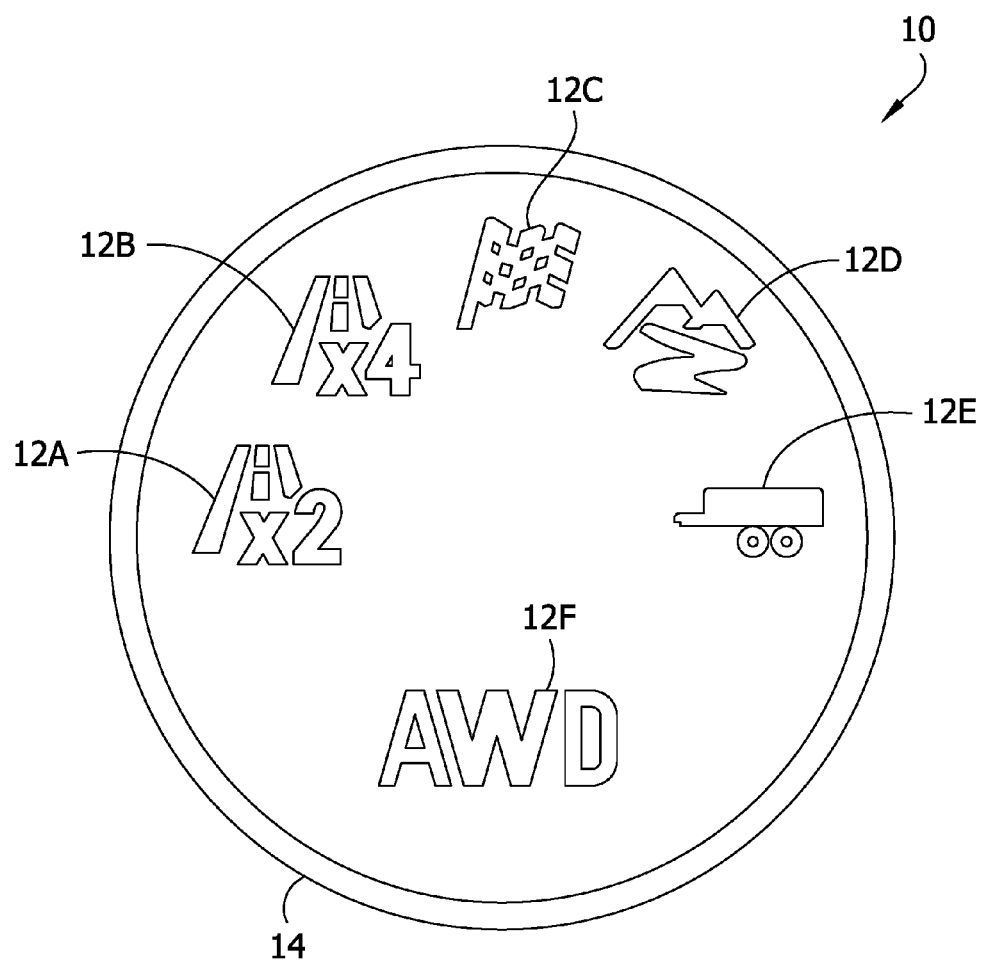
FIG. 1 illustrates a vehicle function indicator according to an embodiment of the invention.

FIG. 1 illustrates a display in the form of a vehicle function indicator 10 according to an embodiment of the invention. In a typical implementation, the vehicle function indicator 10 is mounted in a vehicle (not shown) such that it is visible by the vehicle's operator. The vehicle function indicator 10 displays a plurality of graphical elements 12 in the illustrated embodiment. According to aspects of the invention, each of the graphical elements 12 is associated with a vehicle function such as an operating mode. The vehicle function indicator 10 cooperates with a vehicle control module (not shown) that signals which of the graphical elements 12 should be illuminated to indicate which of the vehicle's functions has been activated. For example, vehicle function indicator 10 is incorporated in a knob 14. In operation, the operator rotates the knob 14 to selects a ride mode, such as front-wheel drive, all-wheel drive, sport, off-road, towing, and all-wheel drive ON/OFF. The ride modes in the example are associated with graphical elements 12A-12F, respectively. In an embodiment, the position of knob 14 sends a "scroll up" or "scroll down" signal to the vehicle control module (e.g., a Body Control Module (BCM)) to generate a vehicle function signal, or indicator signal, for driving the indicator 10.

In FIG. 1, indicator 10 illuminates one of the graphical elements 12A-12F in response to the vehicle function signal depending on the selected ride mode, i.e., the active vehicle function. Each of the graphical elements 12 is adapted to be selectively illuminated by a corresponding indicator light (see FIG. 2 and FIG. 3) as, for example, the BCM scrolls through the available options. Moreover, each of the graphical elements 12 is adapted to be backlit by a corresponding backlight (see FIG. 2 and FIG. 3) during, for example, low light conditions. As described below in connection with FIG. 2 and FIG. 3, the backlighting for a particular one of the graphical elements 12 remains ON until the mode for a corresponding function of the indicator 10 is activated. The backlighting for the particular graphical element 12 is turned OFF when the corresponding indicator light is turned ON to prevent the indicator light from being "washed out" while the backlighting for the other graphical elements 12 remain powered. In an embodiment of the invention, the indicator light is distinguishable from the backlight by color and/or intensity (i.e., brightness) and the circuit accomplishes the desired backlighting and indicator illumination without compromising the color or the intensity of the graphical elements.

Figure 2:
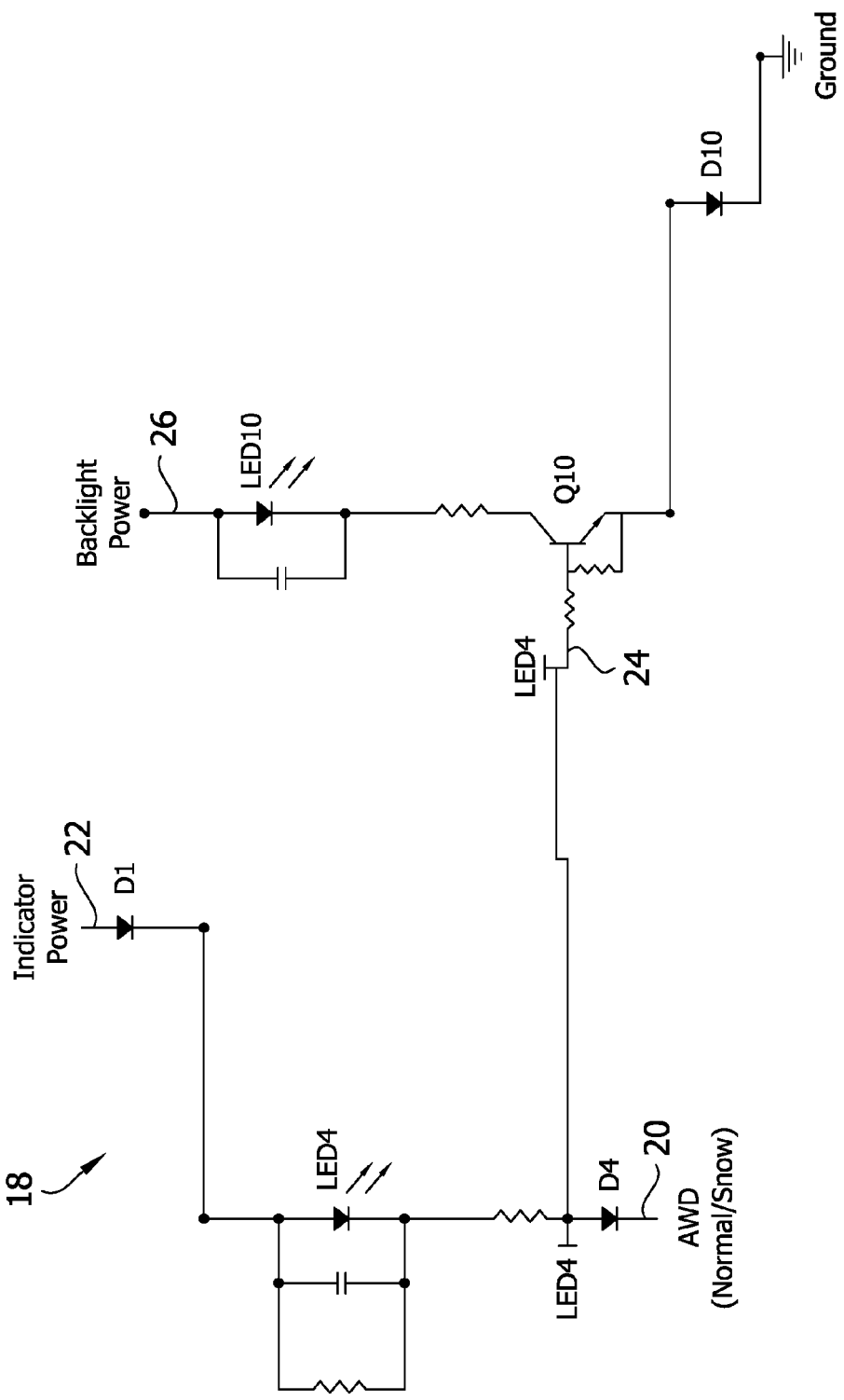
FIG. 2 is an electrical schematic illustrating an indicator circuit according to an embodiment of the invention.

Referring now to FIG. 2, an indicator circuit 18 embodies aspects of the invention. The vehicle control module (e.g., the BCM) provides a vehicle function signal in the form of an active low indicator signal at lead 20. In the illustrated embodiment, the lead 20 is labeled AWD (Normal/Snow) and corresponds to the all-wheel drive ride mode being active. The active low indicator signal causes an indicator LED4, which is the indicator light associated with graphical element 12B, to turn ON. In other words, the vehicle control module pulls lead 20 to a low value (e.g., ground), which in turn causes indicator LED4 to conduct and draw power from the indicator power source represented at lead 22. If lead 20 is open then indicator LED4 is OFF.

As configured, the indicator circuit 18 includes a switch Q10 coupled to a backlight LED10, which is the backlight associated with graphical element 12B. The switch Q10 is connected between the backlight LED10 and ground and, as shown in FIG. 2, has a drive terminal 24 connected to the indicator LED4. Assuming conditions warrant backlighting the graphical elements 12, switch Q10 conducts thus causing backlight LED10 to conduct and draw power from the backlight power source represented at lead 26. In one embodiment, a pulse-width modulated instrument lamp dimming source collectively drives backlight LED10 as well as other backlights associated with the other graphical elements 12. Receiving the active low indicator signal at lead 20 turns ON indicator LED4. This results in a low voltage signal (e.g., the voltage of diode D4 at 0.7 volts) applied to the drive terminal 24 of switch Q10. In other words, turning ON indicator LED4 essentially applies the active low indicator signal to drive terminal 24. The low drive signal at drive terminal 24 causes switch Q10 to turn OFF, which selectively turns OFF backlight LED10 by preventing current from flowing from the backlight power source at lead 26 through backlight LED10 to ground. In addition, the line diode D4 and the reverse battery diode D10 protect the switch Q10.

In an embodiment, switch Q10 comprises an NPN transistor having a base, collector, and emitter. The drive signal applied to the base (i.e., drive terminal 24) comprises the active low indicator signal from the vehicle control module for driving the base of the NPN transistor to bias OFF the corresponding backlight when the corresponding indicator light is ON. It is to be understood that a PNP transistor could be used and driven by an active high indicator signal.

Figure 3:
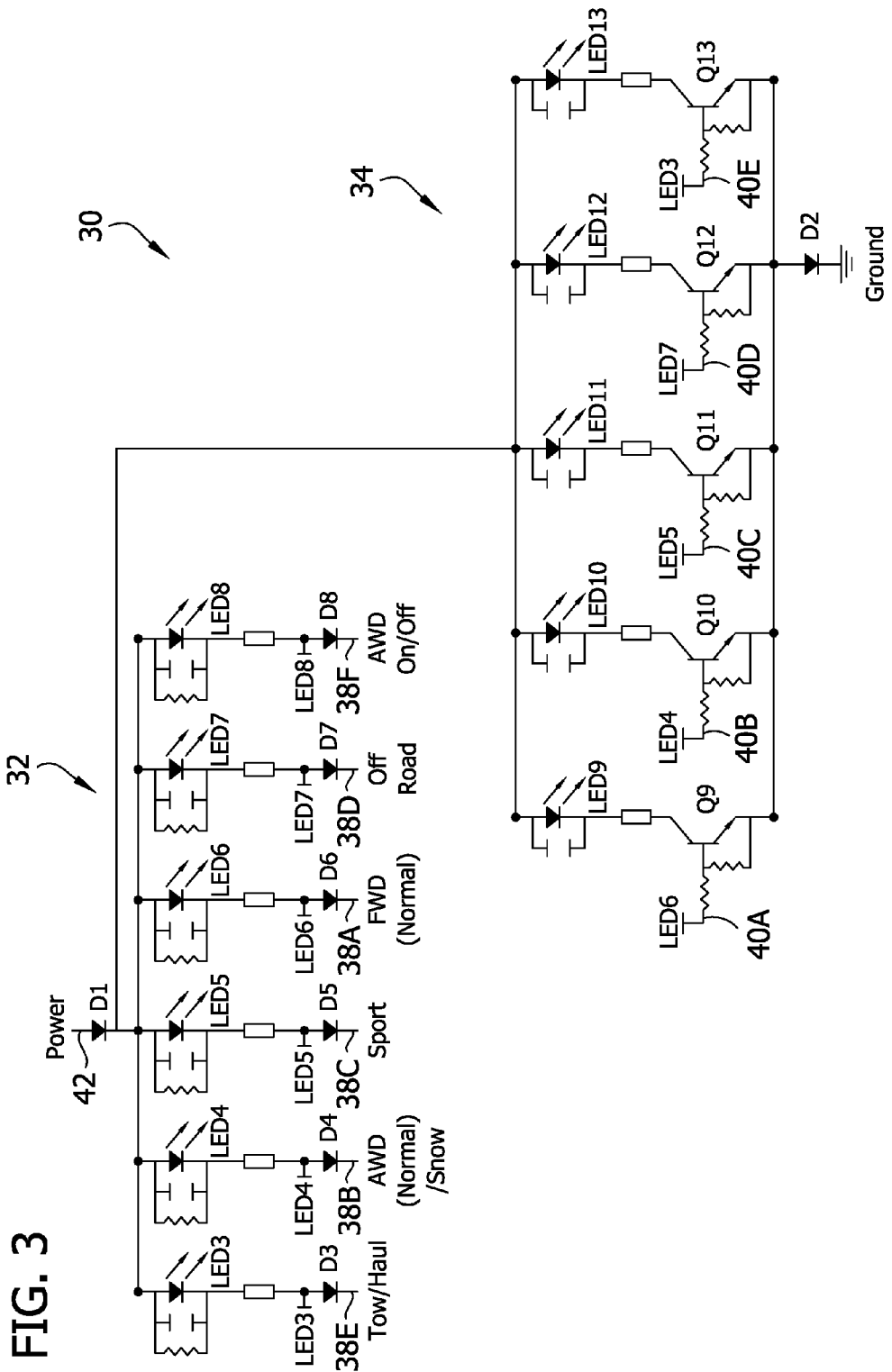
FIG. 3 an electrical schematic illustrating an indicator circuit according to another embodiment of the invention.

FIG. 3 illustrates an indicator circuit 30 according to another embodiment of the invention. As shown, the indicator circuit 30 comprises a plurality of indicator lights, generally shown at 32, and a corresponding plurality of backlights, generally shown at 34. The indicator circuit 30 permits turning OFF a particular backlight 34 when the corresponding indicator light 32 for the same graphical element 12 is turned ON. In the illustrated embodiment, the vehicle control module (e.g., the BCM) provides a vehicle function signal in the form of an active low indicator signal at each of leads 38A-38F, depending on which vehicle function is active. The lead 38A is labeled FWD (Normal) and corresponds to the front-wheel drive ride mode being active. The active low indicator signal causes an indicator LED6, which is the indicator light associated with graphical element 12A, to turn ON. In other words, the vehicle control module pulls lead 38A to a low value (e.g., ground), which in turn causes indicator LED6 to conduct and draw power from the indicator power source represented at lead 42. If lead 38A is open then indicator LED6 is OFF.

As shown in FIG. 3, the lead 38B is labeled AWD (Normal/Snow) and corresponds to the all-wheel drive ride mode being active. The active low indicator signal causes an indicator LED4, which is the indicator light associated with graphical element 12B, to turn ON. In other words, the vehicle control module pulls lead 38B to a low value (e.g., ground), which in turn causes indicator LED4 to conduct and draw power from the indicator power source represented at lead 42. If lead 38B is open then indicator LED4 is OFF.

The lead 38C of FIG. 3 is labeled Sport and corresponds to the sport ride mode being active. The active low indicator signal causes an indicator LED5, which is the indicator light associated with graphical element 12C, to turn ON. In other words, the vehicle control module pulls lead 38C to a low value (e.g., ground), which in turn causes indicator LED5 to conduct and draw power from the indicator power source represented at lead 42. If lead 38C is open then indicator LED5 is OFF.

The lead 38D of FIG. 3 is labeled Off Road and corresponds to the off-road ride mode being active. The active low indicator signal causes an indicator LED7, which is the indicator light associated with graphical element 12D, to turn ON. In other words, the vehicle control module pulls lead 38D to a low value (e.g., ground), which in turn causes indicator LED7 to conduct and draw power from the indicator power source represented at lead 42. If lead 38D is open then indicator LED7 is OFF.

As shown in FIG. 3, the lead 38E is labeled Tow/Haul and corresponds to the towing ride mode being active. The active low indicator signal causes an indicator LED3, which is the indicator light associated with graphical element 12E, to turn ON. In other words, the vehicle control module pulls lead 38E to a low value (e.g., ground), which in turn causes indicator LED3 to conduct and draw power from the indicator power source represented at lead 42. If lead 38E is open then indicator LED3 is OFF.

And the lead 38F of FIG. 3 is labeled AWD On/Off and corresponds to the all-wheel drive ON/OFF ride mode being active. The active low indicator signal causes an indicator LED8, which is the indicator light associated with graphical element 12F, to turn ON. In other words, the vehicle control module pulls lead 38F to a low value (e.g., ground), which in turn causes indicator LED8 to conduct and draw power from the indicator power source represented at lead 42. If lead 38F is open then indicator LED8 is OFF.

As configured, the indicator circuit 30 includes a plurality of switches, each corresponding to one of the backlights 34. In the illustrated embodiment, switches Q9 to Q13 are coupled to backlights LED9 to LED13, respectively. The switch Q9, which is the backlight associated with graphical element 12A, is connected between backlight LED9 and ground and, as shown in FIG. 3, has a drive terminal 40A connected to the indicator LED6. Assuming conditions warrant backlighting the graphical elements 12, switch Q9 conducts thus causing backlight LED9 to conduct and draw power from the backlight power source represented at lead 42. Although indicator power and backlight power are shown in FIG. 3 as being tied together, it is to be understood that the indicators 32 could be powered separately from the backlights 34. In one embodiment, the power at lead 42 is vehicle power (e.g., 12 volts).

Receiving the active low indicator signal at lead 38A turns ON indicator LED6. This results in a low voltage signal (e.g., the voltage of diode D6 at 0.7 volts) applied to the drive terminal 40A of switch Q9. In other words, turning ON indicator LED6 essentially applies the active low indicator signal to drive terminal 40A. The low drive signal at drive terminal 40A causes switch Q9 to turn OFF, which selectively turns OFF backlight LED9 by preventing current from flowing from the backlight power source at lead 42 through backlight LED9 to ground. In addition, the line diode D6 and the reverse battery diode D2 protect the switch Q9.

In an embodiment, switch Q9 comprises an NPN transistor having a base, collector, and emitter. The drive signal applied to the base (i.e., drive terminal 40A) comprises the active low indicator signal from the vehicle control module for driving the base of the NPN transistor to bias OFF the corresponding backlight LED9 when the corresponding indicator LED6 is ON. It is to be understood that a PNP transistor could be used and driven by an active high indicator signal.

In a similar manner, the switches Q10 to Q13 of FIG. 3 control the corresponding backlights LED10 to LED13, respectively, in response to drive signals at terminals 40A to 40E, respectively. Advantageously, the graphical element 12 corresponding to the active vehicle function is illuminated by the associated one of the indicators 32 and the associated one of the backlights 34 is OFF but the other backlights 34 associated with the other graphical elements 12 remain ON. In the illustrated embodiment, graphical element 12F is illuminated by LED8 when AWD is active but the indicator circuit 30 does not include a corresponding backlight.

Aspects of the invention embodied by the circuits of FIG. 2 and FIG. 3 prevent "washing out" of graphics with backlighting when status indicators are illuminating the same graphical element or symbol. Advantageously, the circuits of FIG. 2 and FIG. 3 do not require additional pins or wiring updates to achieve the correct illumination for color and intensity.

In operation, aspects of the invention permit alternately backlighting and illuminating each of the graphical elements 12 of vehicle function indicator 10. Lighting circuits, such as indicator circuit 18, 30 are electrically connected to vehicle function indicator 10 wherein each of the lighting circuits corresponds to one of the graphical elements 12. In addition, each of the lighting circuits includes a backlight configured to backlight a corresponding graphical element 12 during a low light condition or the like and an indicator light configured to selectively illuminate the corresponding graphical element 12 for indicating an active vehicle function. By electrically connecting a switch, such as an NPN transistor, to the backlight and the indicator light, aspects of the invention permit alternately backlighting and illuminating the corresponding graphical element 12. In an embodiment, the base of the NPN transistor is driven with an active low indicator signal from the vehicle control module to bias OFF the backlight when the indicator light is ON in response to the active low indicator signal turning ON the indicator light.

Although described in connection with a vehicle control module, aspects of the invention can be used in connection with other backlit displays.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a", "an", "the" and "said" are intended to mean that there are one or more of the elements. The terms "comprising", "including", and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A backlit indicator system comprising:
   a display having a plurality of graphical elements;
   a plurality of lighting circuits, each of the lighting circuits corresponding to one of the graphical elements, each of the lighting circuits comprising:
   a backlight light emitting diode (LED) configured to backlight the corresponding graphical element during a low light condition;
   an indicator LED configured to selectively illuminate the corresponding graphical element for indicating an active vehicle function; and
   a switch for alternately backlighting and illuminating the corresponding graphical element, said switch electrically connected to the backlight LED and to the indicator LED for selectively turning OFF the connected backlight LED, said switch responsive to a drive signal supplied by the indicator LED to turn OFF the backlight LED when the corresponding graphical element is illuminated by the indicator LED.

2. The system of claim 1, wherein the indicator LED is coupled to a power source providing power to the indicator LED when a vehicle function associated with the corresponding graphical element is active.

3. The system of claim 2, wherein the indicator LED is responsive to an indicator signal from a vehicle control module configured for selecting the vehicle function to be activated.

4. The system of claim 1, wherein the switch comprises a transistor connected between the backlight LED and ground and having a terminal connected to the indicator LED for receiving the drive signal when the indicator LED is ON.

5. The system of claim 1, further comprising an instrument lamp dimming source for driving the backlight LED.

6. A method of alternately backlighting and illuminating a graphical element comprising:
   electrically connecting a plurality of lighting circuits to a display having a plurality of graphical elements, each of the lighting circuits corresponding to one of the graphical elements, each of the lighting circuits including a backlight light emitting diode (LED) configured to backlight a corresponding graphical element during a low light condition and an indicator LED configured to selectively illuminate the corresponding graphical element for indicating an active vehicle function;
   electrically connecting a switch to the backlight LED and the indicator LED for alternately backlighting and illuminating the corresponding graphical element, wherein the switch comprises an NPN transistor having a base, collector, and emitter; and
   responsive to an active low indicator signal from a vehicle control module turning ON the indicator LED, driving the base of the NPN transistor with the active low indicator signal to bias OFF the backlight LED when the indicator LED is ON.

7. The method of claim 6, further comprising coupling the indicator LED to a power source providing power to the indicator LED when a vehicle function associated with the corresponding graphical element is active.

8. The method of claim 6, further comprising driving the backlight LED with an instrument lamp dimming source.

9. The method of claim 6, further comprising providing the backlight LED and the indicator LED having at least one of a different color and a different intensity.

10. The method of claim 9, further comprising pulse width modulating the lamp dimming source.

* * * * *